(12) United States Patent
O'Keefe

(10) Patent No.: US 6,941,477 B2
(45) Date of Patent: Sep. 6, 2005

(54) TRUSTED CONTENT SERVER

(76) Inventor: Kevin O'Keefe, 30 Woodridge Rd., Duxbury, MA (US) 02332

( * ) Notice: Subject to any disclaimer, the term of this patent is extended or adjusted under 35 U.S.C. 154(b) by 797 days.

(21) Appl. No.: 09/903,124

(22) Filed: Jul. 11, 2001

(65) Prior Publication Data
US 2003/0014666 A1 Jan. 16, 2003

(51) Int. Cl.[7] .................. G06F 1/12; G06F 13/42; H04L 5/00; H04L 7/00
(52) U.S. Cl. .................. 713/201; 713/182; 705/51; 707/10
(58) Field of Search .................. 713/182; 705/51; 707/10

(56) References Cited

U.S. PATENT DOCUMENTS

| | | | |
|---|---|---|---|
| 4,349,695 A | | 9/1982 | Morgan et al. |
| 4,393,269 A | | 7/1983 | Konheim et al. |
| 4,509,851 A | * | 4/1985 | Ippolito et al. ............... 399/77 |
| 5,142,577 A | | 8/1992 | Pastor |
| 5,226,091 A | * | 7/1993 | Howell et al. .............. 382/107 |
| 5,511,122 A | | 4/1996 | Atkinson |
| 5,539,826 A | | 7/1996 | Dwork et al. |
| 5,673,318 A | | 9/1997 | Bellare et al. |
| 5,706,427 A | | 1/1998 | Tabuki |
| 5,841,970 A | | 11/1998 | Tabuki |
| 5,987,232 A | | 11/1999 | Tabuki |
| 6,018,801 A | | 1/2000 | Palage et al. |
| 6,044,373 A | | 3/2000 | Gladney et al. |
| 6,076,163 A | | 6/2000 | Hoffstein et al. |
| 6,098,190 A | * | 8/2000 | Rust et al. ................... 714/763 |
| 6,138,239 A | | 10/2000 | Veil |
| 6,145,084 A | | 11/2000 | Zuili et al. |
| 6,398,245 B1 | * | 6/2002 | Gruse et al. ................ 280/228 |
| 6,526,092 B1 | | 2/2003 | Nelson et al. .............. 375/222 |
| 6,708,157 B2 | * | 3/2004 | Stefik et al. .................. 705/59 |
| 6,715,075 B1 | * | 3/2004 | Loukianov .................. 713/176 |
| 6,721,721 B1 | * | 4/2004 | Bates et al. .................... 707/1 |
| 6,779,039 B1 | * | 8/2004 | Bommareddy et al. ..... 709/238 |
| 6,807,534 B1 | * | 10/2004 | Erickson ...................... 705/51 |

* cited by examiner

Primary Examiner—Ayaz Sheikh
Assistant Examiner—Ramya Ananthanarayanan
(74) Attorney, Agent, or Firm—McCormick, Paulding & Huber LLP

(57) ABSTRACT

A method and apparatus for providing access to authenticated electronic documents over a network. The apparatus comprises a server computer, a user interface connected to the server via a first network interface for providing user access to the server, a computer network containing the electronic documents connected to the server via a second network interface, a database connected to the server via a third network interface, for storing data for authenticating the electronic documents. The first network interface, second network interface and the third network interface are disjunct respective to each other such that the user, the computer network and the database are not in communication therebetween. The apparatus further comprises a verification server having first and second network interfaces for connecting the computer network and the database thereto, wherein the first and second network interfaces are disjunct such that the database is not accessible to the computer network.

18 Claims, 7 Drawing Sheets

TCS Content Table

| | | |
|---|---|---|
| 122 —* | TSC ID | integer |
| 124 — | TSC SUM | integer |
| 126 — | TSC STATUS | character |
| 128 — | TSC LR SEED | integer |
| 130 — | TSC RL SEED | integer |

105

TCS Content IDTable

| | | |
|---|---|---|
| 132 —* | TSC ID | integer |
| 134 —* | TSC ID SEQ | integer |
| 136 —* | Content ID | character |

115

*Table Key

FIG. 7

TRUSTED CONTENT SERVER

FIELD OF THE INVENTION

The present invention relates to a method and apparatus for providing trusted access to a network, and more particularly, to a method and apparatus for providing access to authenticated documents over a network.

BACKGROUND

Advances in technology provide increasing capabilities for electronic file duplication and transport making the sharing over a network of electronic documents increasingly easy. The ability to provide nearly instant access to information to millions of users has revolutionized the way many businesses are run. However, it is well known to those who practice in the art that electronic files are easily corrupted, that even secure systems connected to network can be attacked and breached with the subsequent corruption of files. As such, in the current environment, users who receive files from many network sources are unable to verify the authenticity of the files received.

Many applications in a wide range of fields require the ability to provide trusted access to networks. For example, schools or other institutions may need to provide students access to the Internet without fear of exposing the students to inappropriate material. In the financial and insurance industries many documents are forwarded electronically without any guarantee as to the authenticity of the contents thereof.

Known in the art are filtering techniques which attempt to programmatically identify objectionable or non-authentic material both in print and picture formats. Some create lists to objectionable sites to which access is denied. These methods are often prone to error and circumvention as the lists which allow or block access are constantly required to be updated and are vulnerable to low level network traffic which could allow objectionable or other unauthorized material into the system being filtered. Therefore, there is a need for an apparatus and method for providing trusted access to networks wherein the contents of electronic documents received over a network can be authenticated.

SUMMARY OF THE INVENTION

Accordingly, an apparatus and method for providing access to authenticated electronic documents over a network is disclosed. The apparatus includes a server computer having a user interface connected thereto via a first network interface for providing user access to the server. A second network interface connects the server to a computer network containing the electronic documents. A third network interface connects a database to the server. The database stores data for authenticating the electronic documents. The first network interface, second network interface and third network interface are disjunct respective to each other such that the user, the computer network and the database are not in communication therebetween. A verification server having first and second network interfaces connect the computer network and the database to the verification server respectively. The first and second network interfaces connected to the verification server are disjunct, such that the database is not accessible to the computer network. The apparatus according to the present invention provides a user access to authenticated electronic documents contained on a computer network.

Additionally, a method of providing access to authenticated electronic documents over a network is disclosed. The method includes the steps of: 1) Initializing a database by storing indexed information for identifying and authenticating the electronic documents therein; 2) Receiving a user request for an electronic document; 3) Searching for and retrieving information for identifying and authenticating the requested document from the database; 4) Accessing the network and retrieving the content of the requested document; 5) Calculating a checksum or sum value for the content of the retrieved document; 6) Comparing the sum value calculated for the retrieved document with the authenticating information retrieved from the database for the particular document; 7) Determining if the document is authentic; 8) Returning the contents of the document to the user if the contents are determined authentic; 9) Returning a refusal to the user if the content of the retrieved document is not authentic or if the requested document is not indexed in the database; and 10) Updating the database accordingly with the status of the authenticity of the electronic document. The method according to the present invention allows a user to access authenticated electronic documents contained on a computer network.

One advantage associated with the present invention is the ability to provide trusted access to a computer network.

Another advantage associated with the invention is the ability to provide access to selected and authenticated electronic documents contained within a computer network.

Another advantage associated with the invention is the ability to identify the content of electronic documents as trusted or not trusted which is based on a review by individuals. Each document for which access is provided is reviewed individually as to the subject matter or accuracy of the content thereof and after approval, the document is indexed accordingly in the database including randomly generated seed values which are used thereafter to verify the authenticity of the document. Additionally, denial to objectionable material or other not authorized material is automatic as the network is not accessible to the user directly.

Another advantage associated with the present invention is the use of disjunct interfaces to connect the user interface, the network, and the database to the server computer and the verification server to eliminate unauthorized access to the network or the database.

Another advantage is the use of the verification server to iteratively traverse the database containing indexed information for the electronic documents for which access is provided and to retrieve the content of each document, check the authenticity thereof and update the database according with the authenticity status of the particular document, thereby providing for access to authentic electronic documents.

Another advantage is the use of a two pass method of calculating checksums for authenticating the content of electronic documents.

BRIEF DESCRIPTION OF THE DRAWINGS

FIG. 7 is a diagram of one embodiment of the format of a database according to the present invention.

DETAILED DESCRIPTION OF PREFERRED EMBODIMENTS

A detailed description of the preferred embodiments of the invention follows. It is to be understood that the disclosed embodiments are merely exemplary of the invention, which may be embodied in various forms. Therefore, specific structural and functional details disclosed are not to be interpreted as limiting, but rather as a representative basis for teaching one skilled in the art to variously employ the present invention in virtually any appropriately detailed system or structure. It should be understood that the drawings included herewith represent preferred embodiments of the invention only and are included to facilitate an understanding of the invention and not to limit the scope thereof.

Figure 1:
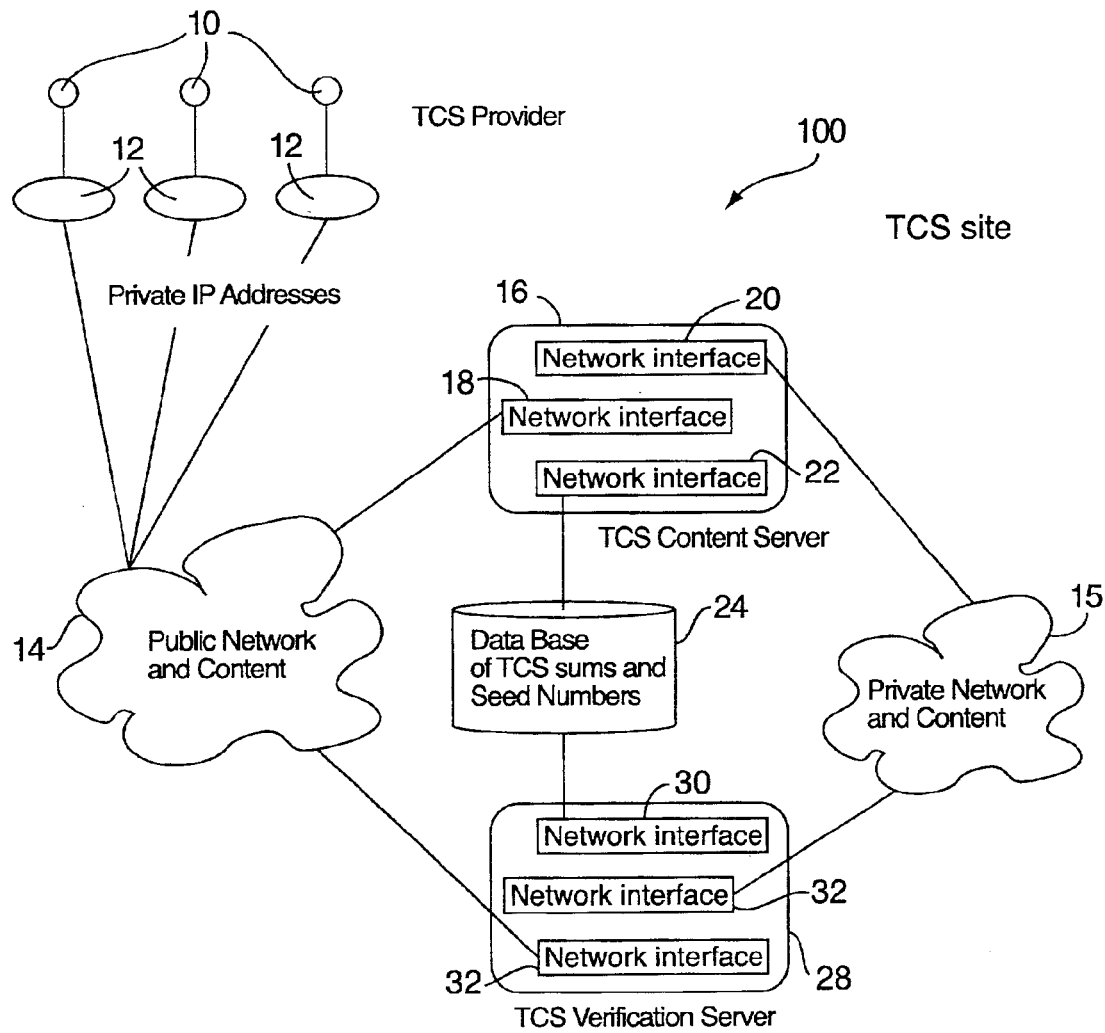
FIGS. 1–3 are block diagrams of various embodiments of the apparatus of the present invention.

Referring to the drawings, wherein like numerals represent like elements throughout the several views, FIG. 1 is a diagram of an apparatus constructed according to one embodiment of the present invention, generally 100, including user 10 having access to computer 12. Computer 12 is connectable to server 16 via public network 14. Server computer 16 comprises a first network interface 18 connected to public network 14 for providing user access to server 16 and connecting server 16 to public network 14. A second network interface 20 connects server 16 to private network 15 for retrieving data from networks 15. A third network interface 22 connects server 16 to database 24. Network interfaces 18, 20, and 22 are disjunct with respect to each other, such that user 10, networks 14 and 15, and database 24 are not in direct communication therebetween. Server 16 can be configured using individual network cards for each of the interfaces 18, 20, and 22 to eliminate the possibility of unauthorized data transmissions between user 10, network 14, and database 24. The network can be public network 14 such as the Internet or any type of private network 15. Verification server 28 is connected to database 24 via network interface 30 and networks 14 and/or 15 via interface 32. Interfaces 30 and 32 are disjunct relative to each other such that database 24 is not accessible to networks 14 or 15. Interface 32 for connecting verification server 28 to public network 14 or private network 15 could be separate interfaces as shown in FIG. 1 or verification server 28 could be configured to interface both public network 14 and private network 15 using the same interface.

Figure 2:
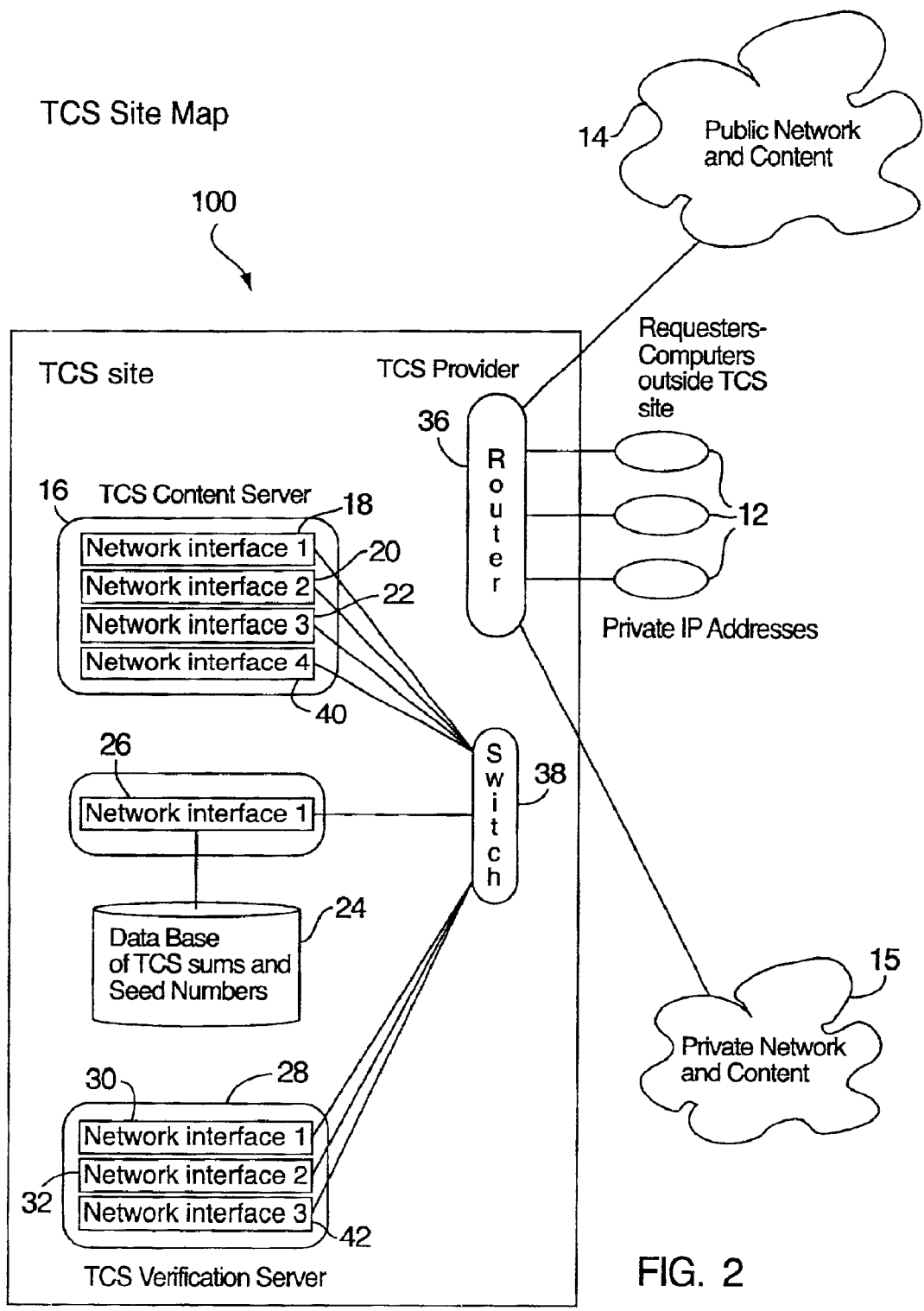

FIG. 2 diagrams an embodiment of the present invention, generally 100, which includes router 36 connected to user machines 12, public network 14, private network 15 and high speed switch 38. Router 36 and switch 38 are for forwarding data interior to apparatus 100 as well as to and from the networks 14 and 15 connected thereto. Router 36 can be configured as a firewall for security purposes.

Figure 3:
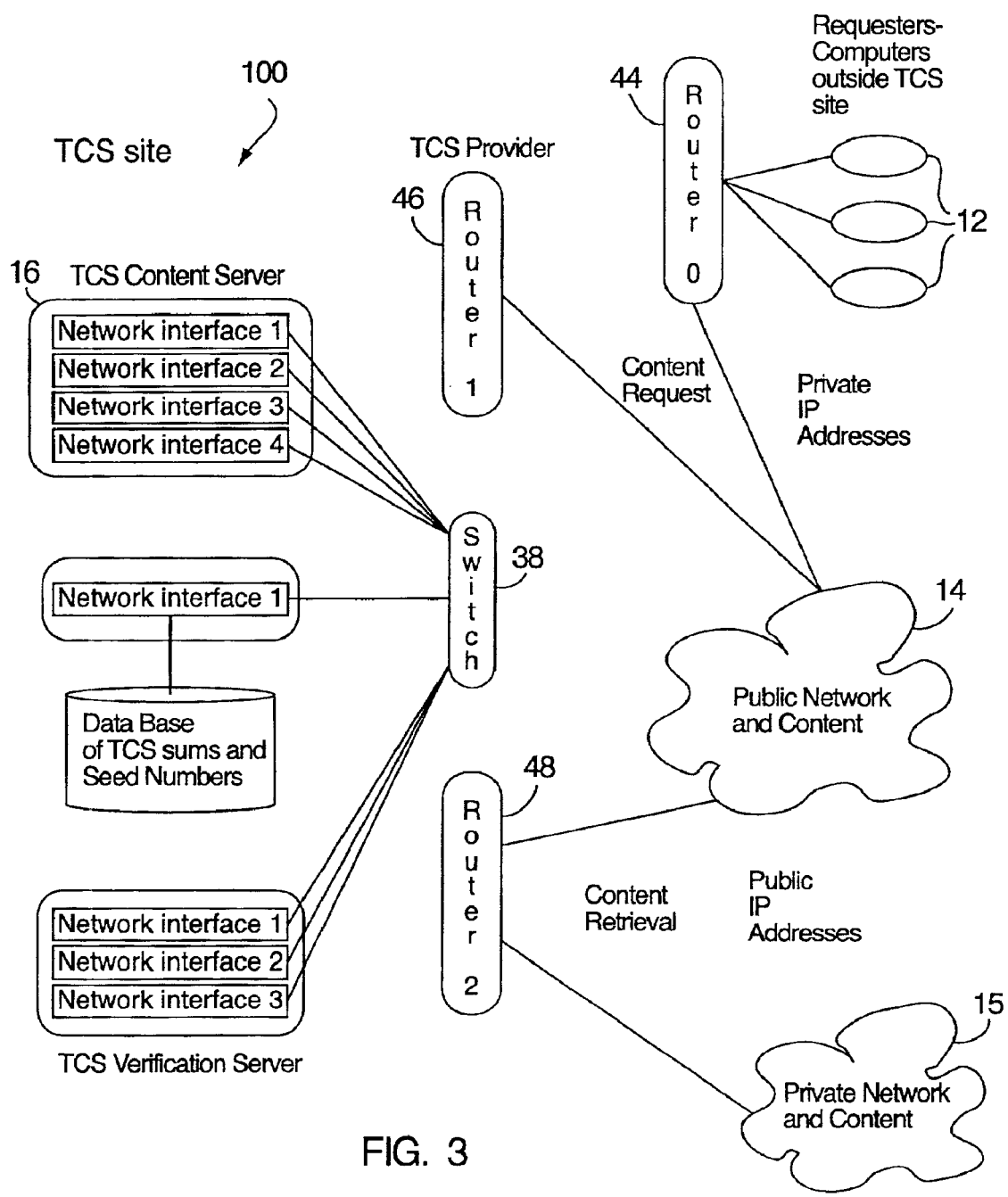

FIG. 3 shows an embodiment of the present invention, generally 100, comprising router 46 connected to high speed switch 38 and public network 14. The FIG. 3 embodiment includes router 46 configured to accept point to point tunneling type connections, on private internet provider addresses from a request router 44. Request router 44 is connected to user machines 12 and router 46 via network 14. Point to point tunneling type connections refers to a protocol that allows entities to extend their own networks through private "tunnels" over a public network such as the Internet, such that, in effect an entity can securely use a public network as its own local network. This type of interconnection is known in the art and may be referred to as a virtual private network. The FIG. 3 embodiment of the present invention is configured to utilize point to point type connections such that a virtual private network is established between apparatus 100 and user machines 12. Referring again to the FIG. 3 embodiment of the present invention, a third router 48 is connected to switch 38, public network 14 and private network 15 for retrieving data from networks 14 and 15.

Figure 4:
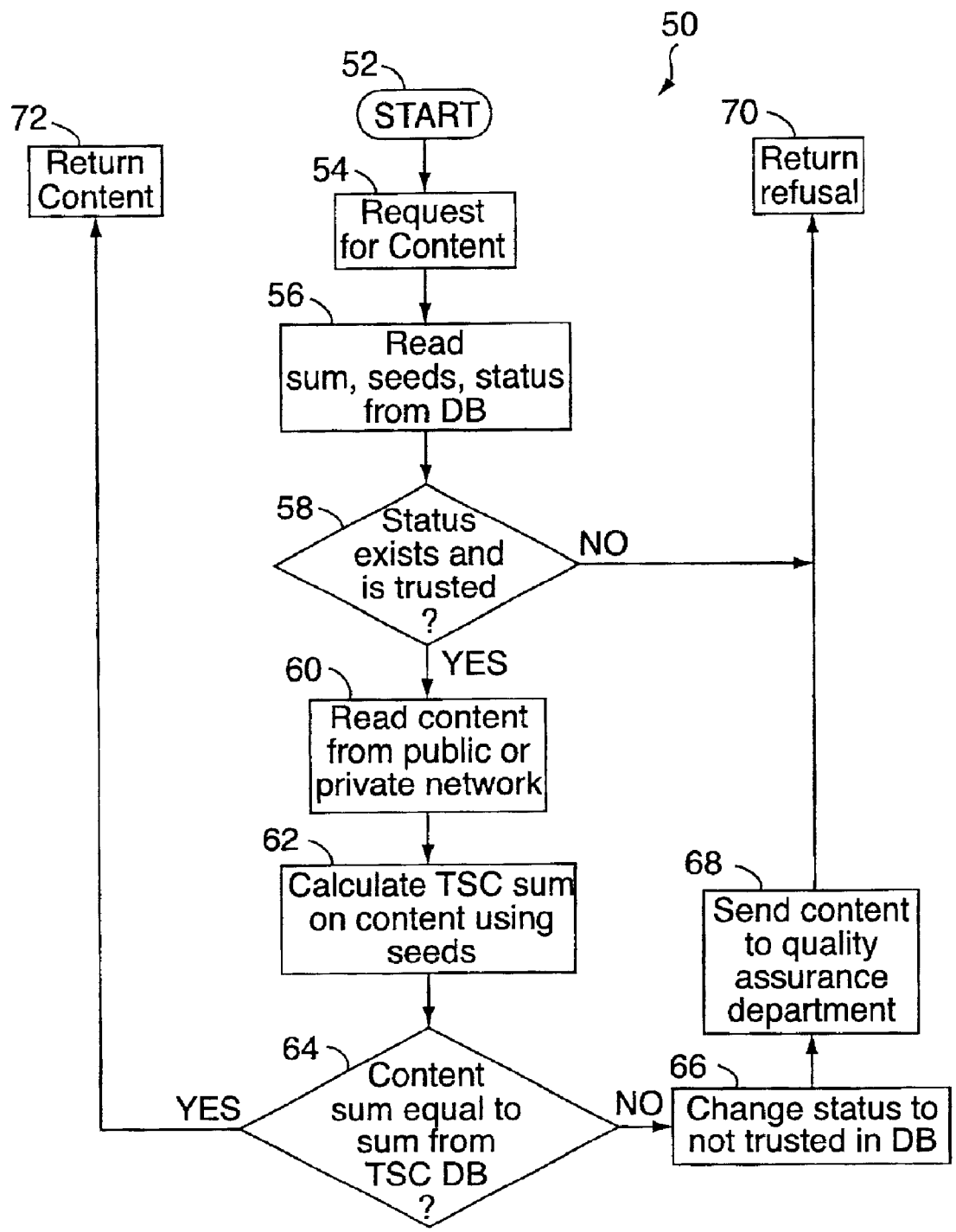
FIG. 4 is a flow chart representing the method for providing access to authenticated documents over a network according to the present invention.

Referring to FIG. 4 a flowchart is generally indicated at 50. The flowchart 50 represents a method used according to the present invention for providing access to authenticated documents contained in computer network 14 or 15 utilizing user machines 12 and apparatus 100. The method utilized by server 16 begins at 52. A user request for content from the network is input at 54. The user request could be a programmatic request from a remote computer. Database 24 is accessed at 56 and authenticating information for the particular content requested is searched for and retrieved therefrom. At 58 a determination is made whether or not database 24 contains information regarding the particular content requested as well as the authenticity status of the content if it exists in the database 24. If the authenticity status of the requested content is negative or if the requested content is not indexed in database 24, then a refusal is returned to the user at 70. If the requested content is indexed in database 24 and the authenticity status therefor is determined positive at 58, network 14 or 15 is accessed at 60 and the requested content is copied therefrom. A checksum is calculated at 62 using the authenticating information retrieved from database 24 at 56 and a predetermined algorithm. At 64 a comparison is made between the checksum calculated at 62 and the stored checksum for the particular content retrieved from database 24 at 56, if the checksums are equal, the requested content is returned to the user at 72 and the method is terminated. Otherwise, if the checksums are not equal at 64, the authenticity status for the content requested is updated to a negative or not trusted status at 66. The content requested and determined not authentic at 64, and therefore not trusted, is forwarded to a quality assurance department at 68. A refusal is returned to user machine 12 at 70 and the method is terminated.

Figure 5:
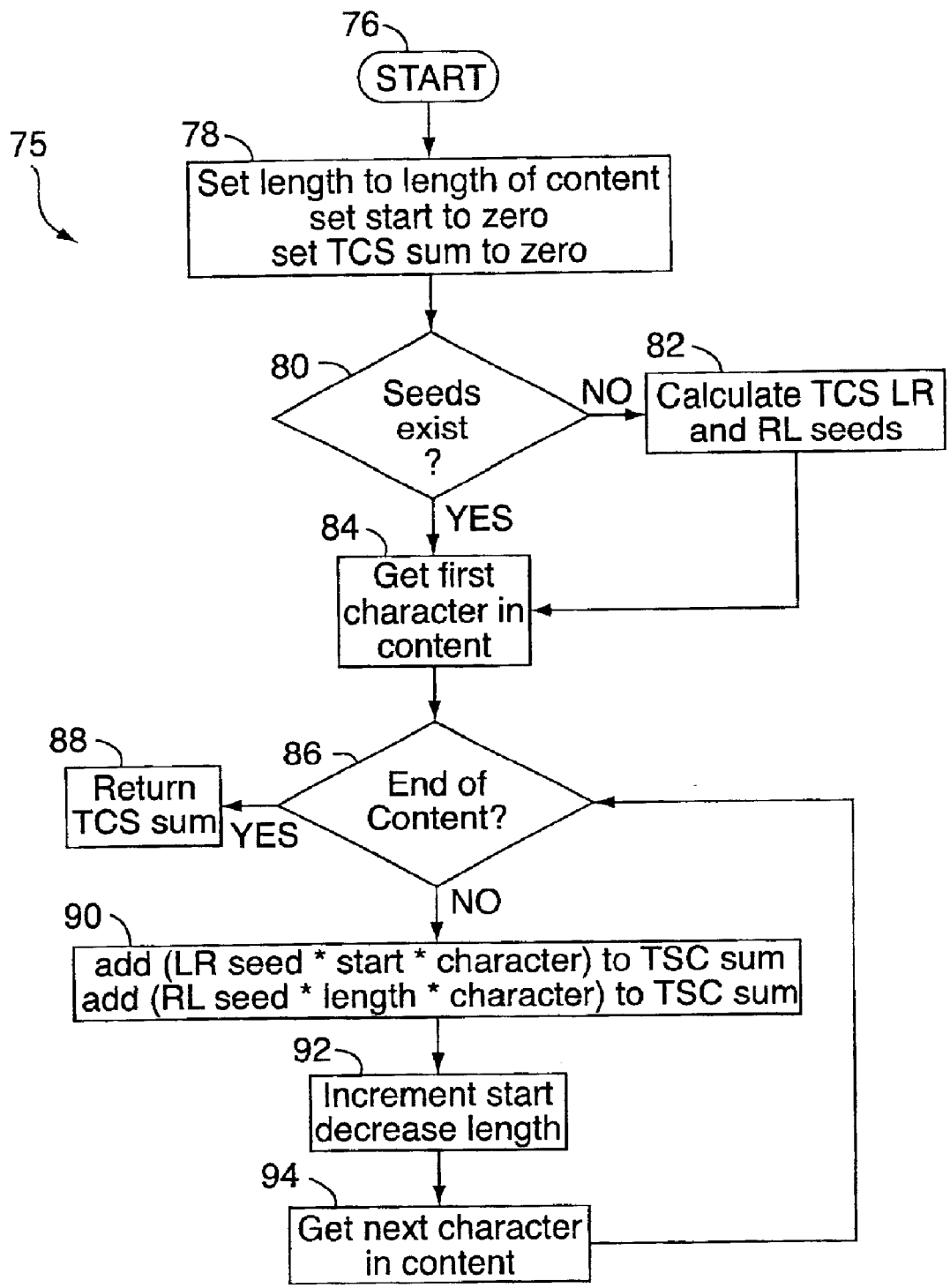
FIG. 5 is a is a flow chart representing one embodiment of the method of calculating checksums for authenticating the content of electronic documents according to the present invention.

Referring to FIG. 5 a flowchart is generally indicated at 75. The flowchart 75 represents a method used according to the present invention for calculating a checksum for a document. The method for calculating a checksum, utilized by server 16 and verification server 28 begins at 76. Counters for the number of characters in the document (start) and the checksum value (TCS sum) are initialized to zero at 78. Also, at 78 a length counter (length) is initialized to the number of characters in the document. Database 24 is accessed at 80 to determine if seed values exist for the content for which a checksum is being calculated. If seed values exist in database 24 for the particular document, LR seed value (LR) for the length right, and RL seed value for the return length are retrieved from database 24. If no seed values exist for the document, seed values are determined for length right (LR) and return length (RL) at 82 using a random number generator, and stored in database 24. A character by character traversal of the content of the document begins at 84 with the retrieval of the first character. At 86 a determination is made to see if more characters exist or if the traversal of the content is complete. If the traversal of the document is complete, the checksum, TCS sum is returned at 88 and the method for calculating a checksum for a document terminates at 88. Otherwise, if the character traversal is not complete, at 90, the ASCII value of the character is used to increase the TCS value as follows: First, the value of (LR seed*start*character) is added to the value of TCS sum where character is the ASCII value of the character; Secondly, the value of (RL seed*length*character) is added to the value of TCS sum where character is the ASCII value of the character. At 92, the start and length counters are incremented and decreased by one respectively. The next character in the document is retrieved at 94, and returned to the end of content determination step at 86. The method terminates and the TCS sum is returned, at 88, when the traversal of the characters in the document is complete.

Alternatively, a two-pass method for calculating the checksum uses predetermine seed numbers and includes the steps of a) retrieving indexed seed numbers for the document from database 24; b) traversing a forward pass of the data stream of the content of the retrieved document and calculating a first value for each position in said data stream using the seed numbers; c) traversing a reverse pass of the data stream of the content of the retrieved document and calculating a second value for each position in the data stream using the seed numbers; and d) summing the first value and second values.

Figure 6:
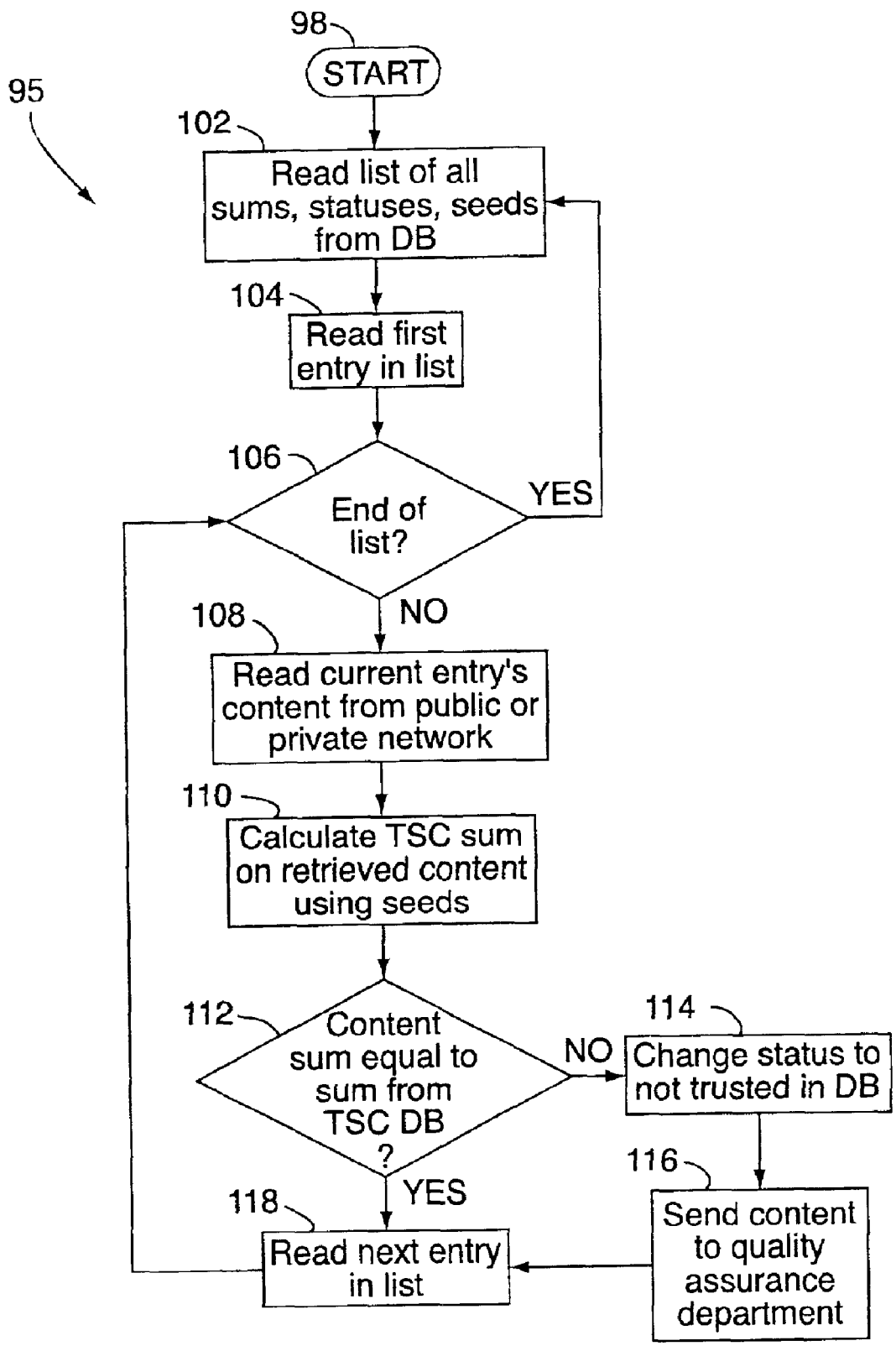
FIG. 6 is a flow chart representing one embodiment of the verification server of the present invention.

Referring to FIG. 6 a flowchart is generally indicated at 95. Flowchart 95 represents a method used by verification server 28 according to the present invention. Verification server 28 constantly cycles through database 24 and retrieves the information stored therein for identifying and authenticating the particular documents contained in the network 14 or 15. Verification server 28 retrieves from network 14 or 15 the content of the document identified and checks the authenticity thereof using the information retrieved from database 24 and the checksum calculation shown in FIG. 5 and described above. A preferred method of authentication utilized by verification server 28 is outlined in flowchart 95. The method starts at 98. Database 24 is accessed and the list of identification and authentication information for all documents indexed in database 24 is retrieved at 102. In particular, the information retrieved at 102 includes the TCS sum, authentication status, seed values, and address information for each document indexed in the list. The first entry from the list is read at 104. A determination is made at 106, whether or not the entry read at 104 is the end of the list. If the entry is determined to be the end of the list at 106, verification server 28 returns to database 24 at 102 and retrieves the entire list stored therein. Otherwise, at 108, the content identified by the current entry is retrieved and copied from network 14 or 15. At 110. a checksum is calculated for the content retrieved using the algorithm described above and shown in FIG. 5. One skilled in the art will recognize that any appropriate algorithm could be utilized and that the one identified in FIG. 5 is merely a preferred algorithm identified by the Applicant. At 112 a determination is made whether or not the content retrieved is authentic by comparing the checksum calculated at 110 with the checksum value read from database 24 for the particular document. If the checksums are determined to be equivalent, the retrieved content is determined authentic, and the server 28 reads the next entry in the list and returns to 106. Otherwise, if the checksums at compared at 112 are not equal, the content is determined not authentic and the authenticity status for the entry is updated to negative or not trusted in database 24. If determined not authentic, or not trusted, the content of the document is forwarded to a quality assurance department for further review at 116. Thus, according to the present invention, verification server 28 continuously traverses database 24 checking the authenticity of each entry indexed therein.

Referring to FIG. 7, tables 105 and 115 represent one embodiment of the format of database 24 for each indexed document stored therein, according to the present invention. At 122, an identification for the document is stored in the form of an integer. At 124, the checksum (TCS sum), is stored for the content of the document as an integer. The authenticity status for the content of the document is stored as a character at 126. At 128, and 130 seed values (LR) for the length right, and (RL) for the return length, respectively are stored in database 24. Identification integer 122 is also used to access the content identification represented by table 115 wherein the Universal Resource Locator (URL) addresses are stored at 136 for each document indexed in database 24 which is contained in public network 14. If the document is contained in a private network an appropriate address therefor would be stored at 136. A content identifier for each document is stored at 136 in database 24.

The applicant has suggested that some of the many uses of the trusted content server of the present invention are applications involving internet access for schools, applications related to the financial industry as well as many other industries wherein the authenticity of the content of documents is important. One skilled in the art will recognize that there are many applications wherein the present invention can be used to authentic the content of documents stored on a network.

Thus, while the present invention has been described with preferred embodiments thereof, it will be understood that many modifications will be readily apparent to those skilled in the art. Therefore, it is intended that this invention be limited only by the following claims and the equivalents thereof.

What is claimed is:

1. An apparatus for providing access to a plurality of authenticated electronic documents over a network comprising:
    a server computer;
    a user interface connected to said server via a first network interface for providing user access to said server;
    a computer network connected to said server via a second network interface, said electronic documents being accessible through said computer network;
    a database connected to said server computer via a third network interface, said database storing indexed information for authenticating the content of each of said plurality of electronic documents, the indexed information including seed values corresponding to each of said electronic documents;
    said first network interface, said second network interface and said third network interface being disjunct respective to each other such that said user interface, said computer network and said database are not in communication therebetween;
    a verification server comprising first and second network interfaces for connecting said computer network and said database thereto, said first and second network interfaces being disjunct such that said database is not accessible through said computer network, said verification server for iteratively traversing said database and retrieving said indexed information corresponding to a next one of said electronic documents, retrieving said electronic document via said computer network, checking the authenticity of the content of said electronic document using said corresponding seed values and updating the database with a status of the authenticity of said electronic document;

said server computer configured so that upon receipt of a user request for a document, said server queries said database as to whether said requested document is indexed therein and returns a denial if said requested document is not indexed in said database, otherwise said server retrieves said requested document via said computer network, confirms the authenticity thereof using said seed values corresponding to the requested document and returns the contents of the requested document to the user if the requested document is determined to be authentic;

wherein said apparatus provides a user access to a plurality of authenticated electronic documents available through said computer network and prevents the user from directly accessing said computer network.

2. An apparatus for providing access to authenticated electronic documents over a network as defined in claim 1 wherein said access is limited to selected documents.

3. An apparatus for providing access to authenticated electronic documents over a network as defined in claim 1 wherein said access is selective based on the user.

4. An apparatus for providing access to authenticated electronic documents over a network as defined in claim 1 wherein said computer network is a public network.

5. An apparatus as for providing access to authenticated electronic documents over a network as defined in claim 1 wherein said computer network is a private network.

6. An apparatus as for providing access to authenticated electronic documents over a network as defined in claim 1 wherein said computer network is the Internet.

7. An apparatus for providing access to authenticated electronic documents over a network as defined in claim 1 further comprising a router connected to said user interface, said computer network, said server computer and said verification server for forwarding data packets from said computer network to said server computer and said verification server.

8. An apparatus for providing access to authenticated electronic documents over a network as defined in claim 7 further comprising a high speed switch connected between said router and said server computer, said database and said verification server for providing data transmissions therebetween.

9. An apparatus for providing access to authenticated electronic documents over a network as defined in claim 1 further comprising a router connected to said user interface and said server for transmitting data therebetween.

10. An apparatus for providing access to authenticated electronic documents over a network as defined in claim 1 wherein said database contains for each said electronic document indexed information for identifying and authenticating said document and a status indicator for storing the status of the authenticity thereof.

11. An apparatus for providing access to authenticated electronic documents over a network as defined in claim 1 wherein said apparatus is scalable.

12. An apparatus for providing access to authenticated electronic documents over a network as defined in claim 1 wherein said database is updatable.

13. An apparatus for providing access to authenticated electronic documents over a network as defined in claim 1 wherein said user is a computer.

14. A method for providing access to a select group of authenticated electronic documents over a network comprising the steps of:

reviewing the content of each of a plurality of electronic documents to determine whether said electronic document is acceptable based on a review of the subject matter thereof;

generating seed values for each of said electronic documents deemed acceptable for use thereafter in authenticating copies of the content of said electronic document;

initializing a database by storing indexed information for identifying and authenticating each of said electronic documents deemed acceptable, the indexed information including the seed values corresponding to said electronic documents;

receiving a request from a user for an electronic document;

searching and retrieving from said database said indexed information for said requested document, returning a denial for said request if said requested document is not indexed in said database;

accessing said network and retrieving the content of said requested document;

calculating a checksum for the content of said retrieved document;

comparing said checksum with said authenticating information for authenticating the content of said retrieved document;

returning the content of said retrieved document to said user if the content of said retrieved document is authenticated;

returning a refusal to said user if the content of said retrieved document is not authenticated; and updating said authenticating information for said document in said database based on the results of said comparing.

15. A method of providing access to a select group of authenticated electronic documents over a network as defined in claim 14 further comprising the steps of:

iteratively traversing said database and retrieving said indexed information for identifying and authenticating a next one of said electronic documents;

retrieving from said network the content of said next one of said electronic documents.

calculating a checksum for the content of said retrieved document;

comparing said checksum with said authenticating information for authenticating the content of said retrieved document; and updating said database with the authenticity status of said document.

16. A method of providing access to authenticated electronic documents over a network as defined in claim 14 wherein the step of calculating a checksum for the content of said retrieved document further comprising the steps of:

retrieving said seed values for said electronic document from said database;

traversing a forward pass of the data stream of the content of said retrieved document and calculating a first value for each position in said data stream using said seed numbers;

traversing a reverse pass of the data stream of the content of said retrieved document and calculating a second value for each position in said data stream using said seed numbers; and summing said first value and said second value.

17. A method of providing access to authenticated electronic documents over a network as defined in claim 14 wherein the step of calculating a checksum for the content of said retrieved document further comprising the steps of:

retrieving said indexed seed values for said document from said database;

initializing values for said checksum and a start counter to zero;

initializing a length counter equal to the length of the content of said retrieved document; and traversing the content of said document character by character, adding to said checksum a first calculated value and a second calculated value for each character thereof wherein said start counter is incremented and said length counter is decremented for each said character traversed.

18. A method of providing access to authenticated electronic documents over a network as defined in claim 14 wherein said user request is received from a computer.

* * * * *